US011589189B2

(12) United States Patent
Link, II

(10) Patent No.: US 11,589,189 B2
(45) Date of Patent: Feb. 21, 2023

(54) METHOD AND SYSTEM FOR DETERMINING THE LOCATION OF A TRACKING DEVICE

(71) Applicant: M2MD Technologies, Inc., Atlanta, GA (US)

(72) Inventor: Charles M. Link, II, Atlanta, GA (US)

(73) Assignee: MZMDTECHNOLOGIES INC., Atlanta, GA (US)

( * ) Notice: Subject to any disclaimer, the term of this patent is extended or adjusted under 35 U.S.C. 154(b) by 44 days.

(21) Appl. No.: 17/380,689

(22) Filed: Jul. 20, 2021

(65) Prior Publication Data

US 2023/0016774 A1  Jan. 19, 2023

Related U.S. Application Data

(60) Provisional application No. 63/203,231, filed on Jul. 13, 2021.

(51) Int. Cl.
| | | |
|---|---|---|
| *H04W 4/029* | (2018.01) | |
| *H04B 17/318* | (2015.01) | |
| *G06F 3/0482* | (2013.01) | |
| *G01S 19/48* | (2010.01) | |
| *H04W 4/80* | (2018.01) | |

(52) U.S. Cl.
CPC ............. *H04W 4/029* (2018.02); *G01S 19/48* (2013.01); *H04B 17/318* (2015.01); *H04W 4/80* (2018.02); *G06F 3/0482* (2013.01)

(58) Field of Classification Search
CPC ...... H04W 4/029; H04W 4/80; H04B 17/318; G01S 19/48; G06F 3/0482
See application file for complete search history.

(56) References Cited

U.S. PATENT DOCUMENTS

| | | | | |
|---|---|---|---|---|
| 9,532,312 B1* | 12/2016 | Kim | ................... | H04W 52/0277 |
| 10,068,456 B2* | 9/2018 | Cox | .................... | G08B 21/0286 |
| 2004/0203433 A1* | 10/2004 | Najafi | ................... | H04B 17/318 |
| | | | | 455/67.11 |
| 2014/0364099 A1* | 12/2014 | Pai | .......................... | H04W 4/02 |
| | | | | 455/418 |
| 2015/0256275 A1* | 9/2015 | Hinman | ................. | H04B 17/23 |
| | | | | 455/63.4 |
| 2017/0108574 A1* | 4/2017 | Cox | ........................ | G01S 5/0231 |

(Continued)

*Primary Examiner* — Steven S Kelley

(74) *Attorney, Agent, or Firm* — John L. Doughty; Doughty Law, L.L.C.

(57) ABSTRACT

An application running on a UE receives a command through a user interface or from a server to initiate the locating of a tracking device. The tracking device determines one or more hot spots it is close to. A server determines whether to instruct the tracking device to use its GNSS circuitry to determine its location based on a comparison of location information corresponding to the hot spot(s) and user selectable accuracy criteria. The UE may detect a beacon signal and determine an initial value corresponding to an initial signal strength of the beacon. The beacon may only broadcast for a predetermined period based on location scenario. The application produces a default initial indication, based on the initial signal strength and uses updated beacon signal strength values to adjust the indication relative to the default indication based on the updated signal strength value relative to the initial signal strength value.

19 Claims, 7 Drawing Sheets

(56) References Cited

U.S. PATENT DOCUMENTS

| | | | |
|---|---|---|---|
| 2017/0221341 A1* | 8/2017 | Pai | H04W 4/80 |
| 2017/0374515 A1* | 12/2017 | Cox | G01S 5/14 |
| 2019/0114887 A1* | 4/2019 | Brantley | G08B 21/0288 |
| 2019/0206233 A1* | 7/2019 | Huseth | H04W 4/90 |
| 2020/0068372 A1* | 2/2020 | Daoura | H04L 67/02 |
| 2021/0033692 A1* | 2/2021 | Harvey | G08B 25/08 |
| 2021/0152976 A1* | 5/2021 | Daoura | H04W 52/0229 |
| 2022/0301410 A1* | 9/2022 | Erdmann, IV | H04W 4/80 |

\* cited by examiner

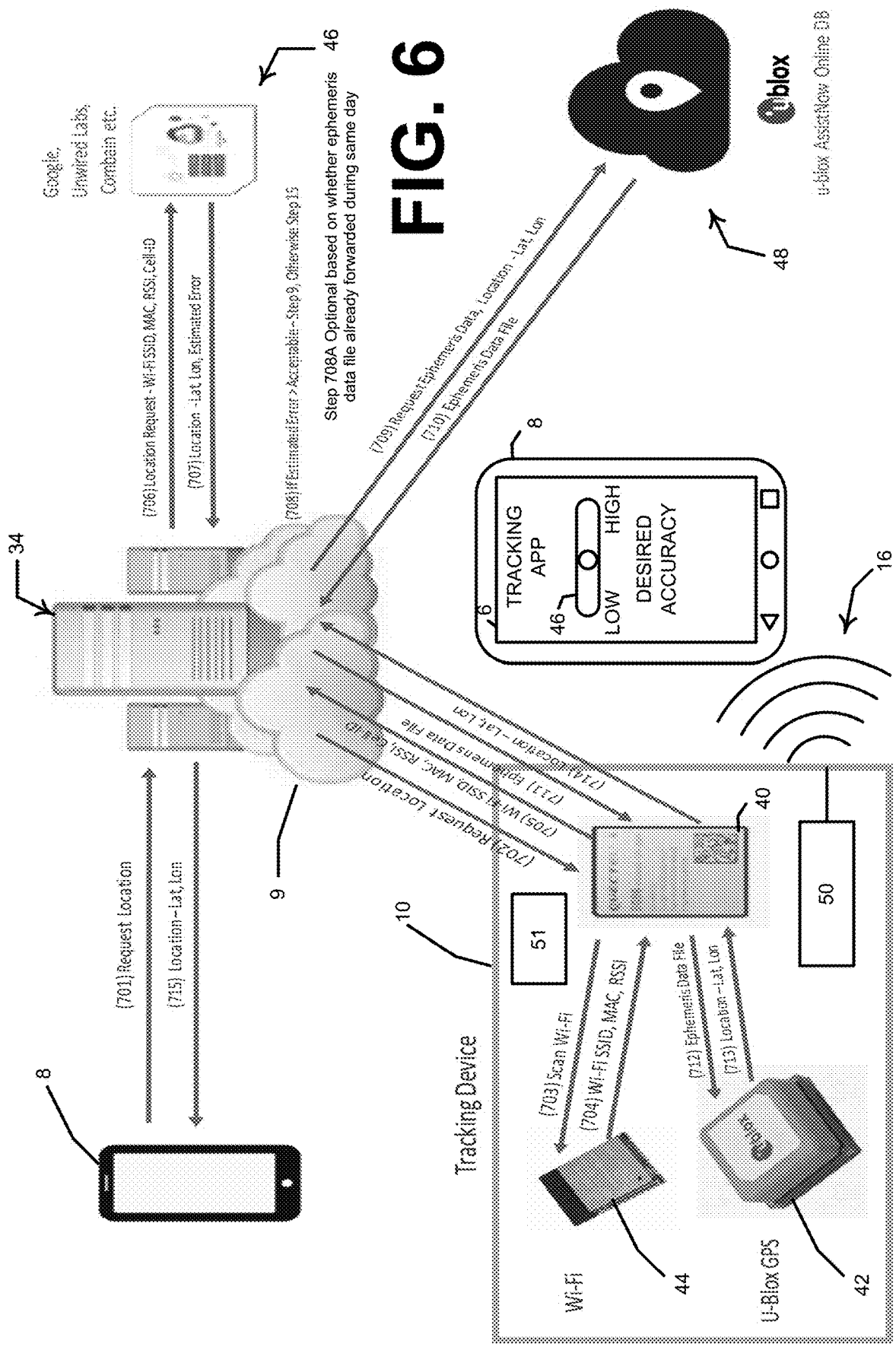

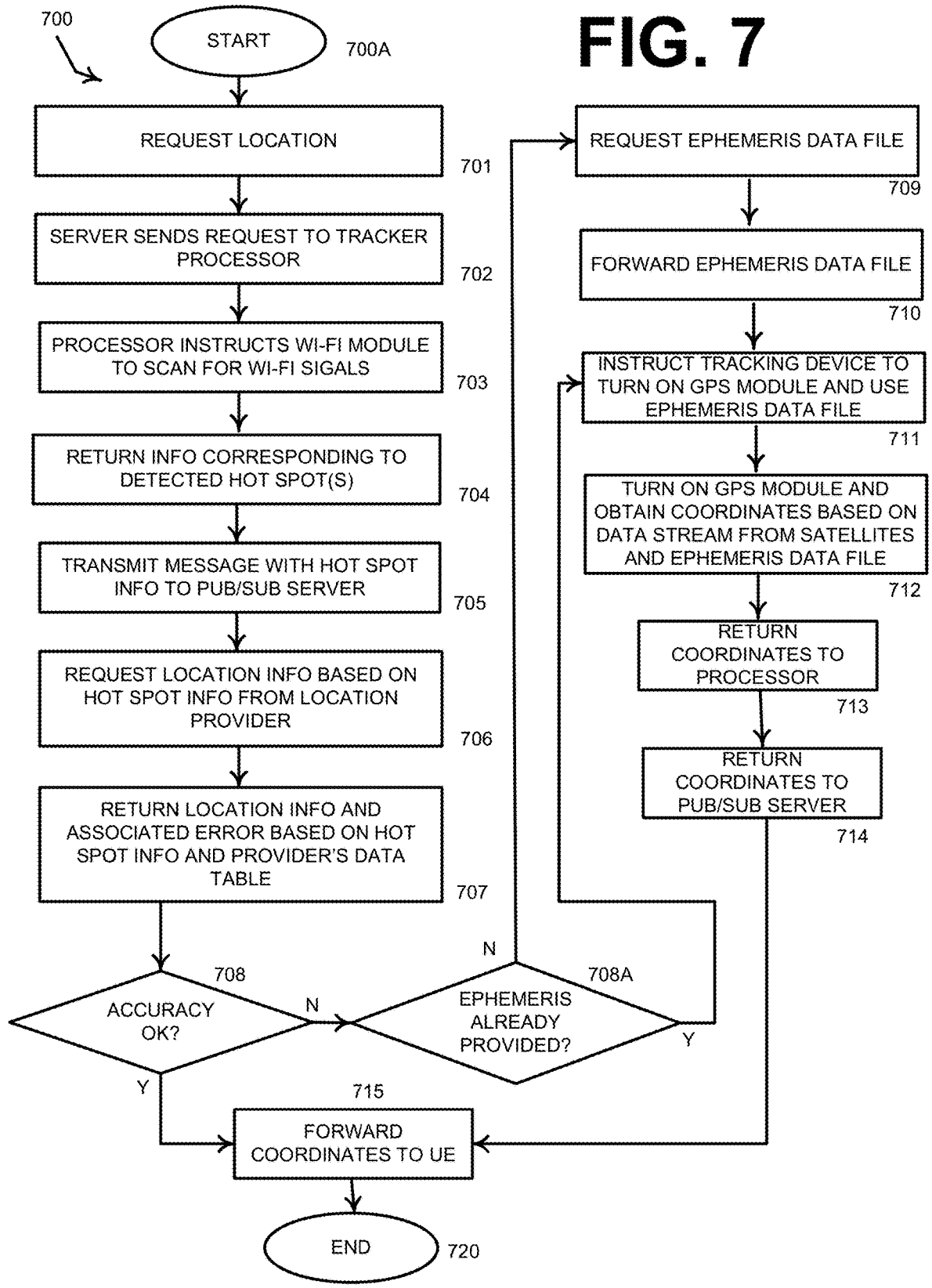

METHOD AND SYSTEM FOR DETERMINING THE LOCATION OF A TRACKING DEVICE

CROSS REFERENCE TO RELATED APPLICATION

This application claims priority under 35 U.S.C. 119(e) to U.S. provisional patent application No. 63/203,231 "Method and system for determining the location of a tracking device," which was filed Jul. 13, 2021, and which is incorporated herein by reference in its entirety.

FIELD

The present invention relates to tracking devices, and more particularly to determining the location of, and the proximity of a user equipment device to, a tracking device.

BACKGROUND

Wireless communications devices serve many purposes in today's connected world. In addition to providing communication between people using such devices, wireless communications devices may use sensors to provide information regarding the environment surrounding the device to a user. Such information may be provided wirelessly to another wireless communication devices, such as a user equipment device ("UE"). Examples of user equipment devices include smart phones, tablets, smart watches, and the like. Information that may be provided to a UE includes the location of the device that is providing the information. A device may use myriad means and methods for determining its location, such as GNSS and triangulation between cellular towers or triangulation between Wi-Fi hot spots.

However, although the resolution of location information determined using GNSS or triangulation techniques may be acceptable for use in locating a large object such as a vehicle or an item that is being shipped in a vehicle, such resolution may not be good enough to locate a small item being tracked inside of a large vehicle like a truck, a ship, or a plane. GNSS resolution may also not be adequate for locating a small item being tracked, such as a key ring or other small item of personality that often gets lost (or hides in plain sight) in someone's home, office or yard among clutter, furniture, or vegetation.

GNSS and Cellular Radios require relatively a relatively large amount of battery energy to operate and after most battery power is exhausted, the battery may not have enough energy to power a cellular radio or GNSS for locating a small item and subsequently the item being tracked may be lost forever.

SUMMARY

A tracking device may communicate its location to a central tracking server using a long-range wireless communication network, such as a cellular telephony/data network. Examples of such a long range wireless networks include network operated according to 3G, 4G, 5G, LTE, LTE Cat 1, LTE M, NB-IoT, EC-G-SM-IoT, and similar communication network standards in existence or future variants, permutations, and evolutions thereof. A tracking device that communicates via long range wireless network typically includes long-range wireless radio circuitry. A tracking device may also communicate via various short range wireless communication standard protocols, including Wi-Fi, Bluetooth ("BT"), Bluetooth Low Energy ("BLE"), ANT, ANT+, ISA100, Wireless HART, ZigBee, and 6LoPAN, Wireless Regional Area Network ("WRAN"), NFC, RH), 6LoWPAN, ZigBee, Z-Wave, and Ultra Wideband. A tracking device that communicates via short range wireless network typically includes short-range wireless radio circuitry. A tracking device may also include Global Navigation Satellite System ("GNSS") circuitry for obtaining information corresponding to its location from information streams emitted from multiple Global satellite constellations, including Global Positioning System ("GPS") (originally NAVSTAR GPS), GLONASS, Galileo, and BeiDou, or location information corresponding to the tracking device's location may be obtained from a single constellation system such as GPS. It should be understood that anywhere that the term 'GNSS' is referenced herein may be a reference to any one or more of a plurality of satellite constellations as discussed in this paragraph.

Since tracking devices are typically used to determine the location of a given tracking device, or a movable object that the tracking device is attached or affixed to, the radio circuitry, GNSS circuitry, and other electronic circuitry that composes a given tracking device typically operates by using power supplied by a battery that is part of the tracking device, although power may also be obtained from environmental sources such as sunlight, artificial light, ambient heat surrounding the tracking device, or motion imparted to the tracking device as the tracking device moves within an electric, magnetic, or gravitational field. Minimizing energy use of a battery-powered tracking device in reporting its whereabouts is a goal of designing circuitry of a tracking device and the software that operates the tracking device.

Location information of a tracking device, such as position coordinates, tracking areas, tracking regions, presence on a given roadway or walkway, presence at a building, venue, or parking lot, or presence within a vehicle, may be used to monitor and track the location and movement of individuals, such as children, Alzheimer's syndrome patients, or mentally ill persons; animals; and inanimate objects such as goods being shipped, a person's keys or other personal effects, vehicles, tools, materials in a manufacturing process, and other items the location of which is valuable to a person or company.

Merchants may track the location of goods as part of an inventory function and/or an anti-theft mode. Tracking devices often aid law enforcement to facilitate recovery of stolen automobiles. Automobile rental agencies may monitor and track locations of automobiles that customers rent to ensure their automobiles are operated within a contracted rental use boundary, or for other purposes.

GNSS technology works best in outdoor where GNSS receiver circuitry, such as may be included in a tracker device, has a line-of-sight communication 'view' to the constellation of satellites from which it receives data streams (e.g., National Marine Electronics Association ("NEMA") data streams). However, a GNSS receiver's ability to determine its location (and the location of a device into or onto which it is attached, affixed, or embedded) is typically attenuated when its line-of-site with the satellites is obstructed by structures such as multi-story buildings, bridges, dams, and the like, or natural features such as mountains, hills, valleys, trees, canyons, cliffs, and the like, or weather conditions that include heavy cloud formations.

A computer monitoring application running on a centralized monitoring station may be used, or a computer application executed by a processor of, and running on, a mobile user equipment device ("UE") such as a smart phone or tablet, may be used to monitor the location of one or more persons, objects, assets, items, etc. Either application may display location information received from one or more tracking devices corresponding to the one or more persons, objects, assets, items, etc. on a map, such as a two-dimensional map, a three-dimensional map, or a topological map that depicts landscaping, marine, or other environments. GNSS position information may be wirelessly transmitted from a tracking device that includes a GNSS unit, or between the tracking device and peripheral devices, such as a camera, a smart phone, a tablet (i.e., an Apple IPad), or through a local wireless communication unit/device or interface.

Location of a tracking device attached to, or otherwise connected with, coupled with, or located on a moving object may be determined by achieving ad-hoc short-range wireless connectivity between the tracking device and one or more other communication devices, such as Bluetooth enabled mobile phones that pass by, where the other communication devices can themselves be located, for example using GNSS technology or network-based technologies such as triangulation between cell towers (e.g., eNode Bs) within a wireless mobile network. The location of a given smartphone may be used to approximate the location of a tracking device that is within a given range of the smartphone (i.e., the range of a short-range wireless connection that may be established between the smartphone and the tracking device). In such a scenario, the smartphone may report to a monitoring station that it is close (i.e., within the short-range wireless link's range) to the tracking device and thus the tracking device is essentially located where the smartphone is located.

However, more precise location information of a given tracking device, and thus the location of the person, item, good, or asset the tracking device is attached or affixed to, may be desirable.

In addition, maintaining circuitry of a tracking device in an always 'on' mode is counterproductive to the goal of minimizing power usage by circuitry of the tracking device.

In an aspect a mobile user equipment device ("UE") comprises a non-transitory computer-readable storage medium storing executable computer instructions for an application (which may be referred to as a Find Tracking Device application, tracking device application, tracking application, tracker application or simply the application), that, when executed by a processor, performs steps of a method that comprises displaying on a graphical user interface of an application identifiers of one or more tracking devices associated with a user of the UE, wherein the graphical user interface is configured to receive a selection of an identifier of one of the one or more tracking devices by a user of the UE. The user equipment device may be a smart phone, a tablet, a wearable smart device, a smart watch, laptop computer, desktop computer, and the like. The graphical user interface may be rendered on a display screen of the UE, such as a touch sensitive screen, such that user input to the UE may be received via control items (such as buttons, sliders, toggle switches, radio buttons, text boxes, dropdown lists, search boxes, interactive lists, and the like). In response to a user input selecting a given tracking device or in response to a command received from a remote server, such as a tracking server operated by a tracking device services provider that monitors and administers a fleet of tracking devices, a UE may transmit a beacon request message to a given one of the one or more tracking device based on an identifier of the given tracking device. In an aspect, the tracking server may transmit a beacon request message to a given tracking device instead of the UE transmitting the beacon request message. A beacon request message includes instructions for a tracking device that has received the beacon request message to begin transmitting a beacon signal, such as a Bluetooth Low Energy beacon signal. The UE may transmit the beacon request message when a user of the UE 'hits' or touches a 'Find' button displayed by the graphical user interface on the UE's touch screen display.

In an aspect, after the selected tracking device begins transmitting a beacon signal, the UE detects the selected tracking device's beacon signal and determines an initial signal strength value of the tracking device beacon signal. The tracking device's beacon signal will typically be stronger at the UE the closer the UE is the tracking device. However, the UE does not attempt to determine an actual distance to the tracking device based on the strength of the beacon signal it has received from the tracking device. Rather, the UE tracking application stores the initial signal strength value for use in normalizing the signal strength value to a default value that may be used to determine a default indication position or a default click rate, as will be discussed infra.

After determining the initial signal strength value, the tracking device application determines one or more updated signal strength values of the tracking device beacon signal at corresponding one or more predetermined update periods after determining the initial signal strength value corresponding to the tracking device beacon signal. The update period may be configurable in the application. For example, the application may perform a signal strength determination every second, every half a second, every two seconds, or whatever other value a user of the UE choses.

The application generates an indication that represents the initial strength value after determining the initial signal strength value, or the application generates and indication that represents one or more updated signal strength values signal strength value after the one or more update signal strength values have been determined. It will be appreciated that the indication is not based on a calculated distance from the UE to the tracking device based on a calibration value that relates beacon signal strength to the distance to a source of the beacon. Thus, inaccuracies inherent in using beacon signal strength to determine the distance from a UE to a beacon signal source are avoided.

In an aspect, the indication is emitted from an acoustic transducer (e.g., an audio speaker) of the UE as a sound that repeats at a default click rate that corresponds to the initial signal strength value after the determining of the initial signal strength value of the tracking device beacon signal and wherein the sound repeats at one or more different updated click rates that correspond to the one or more updated signal strength values of the tracking device beacon signal relative to the default rate after the determining of the one or more updated signal strength values of the tracking device beacon signal. In an aspect, the default click rate is the same regardless of the initial signal strength value determined by the UE/application. Thus, in such an aspect, updated click rates represent changes in signal strength relative to the initial signal strength, or relative to signal strength values previously determined after an initial strength value is obtained or determined, but do not necessarily indicate, or represent, a determinable or specific absolute distance. If a user moves around a room or office, or other environment, with his, or her UE running a tracking application looking for a given tracking device while holding the UE or having the UE on his, or her, person, it is possible that a given updated signal strength may equal the initial signal strength value because the UE is the same approximate distance from the tracking device, or at least the beacon's signal strength has not change appreciably, and thus the updated click rate would be the same as the default click rate, although it would be an update click rate for purposes of discussion herein.

In an aspect, the default click rate does not correspond to a specific distance between the mobile user equipment device and the tracking device based on the initial signal strength or the updated signal strength.

As discussed above, the default click rate may not depend on the initial signal strength value, except to the extent that the detecting of a beacon signal from a selected tracking device causes the tracking application to cause the speaker of the UE to emitting a clicking sound at the default rate. For example, the UE could receive a first indication of the beacon signal with a signal strength of −75 dB and cause the speaker to start 'clicking' (for example, so that the clicks sound like a Geiger counter) at a default rate, which for purposes of discussion may be four clicks per second. Two days later, the user could use the same UE to find the same tracker, but this time the initial beacon signal strength is −27 dB instead of −75 dB, but the tracking application would cause the speaker to begin clicking at the same default rate of four clicks per second. As the updated signal strength changes the UE/application causes the click rate to change based on changes in the received beacon signal strength relative to the initial received signal strength.

In an aspect, the rate of the clicks, or click rate, increases when an updated signal strength value is higher than the initial signal strength value or a previously determined updated signal strength value, and the rate of the clicks decreases when an updated signal strength value is lower than the initial signal strength value or a previously determined updated signal strength value.

In another aspect, the indication may be displayed on the graphical user interface as a visual relative location indicator that corresponds to the selected one of the one or more tracking devices, wherein the visual location indicator varies in response to changes of the updated signal strength values.

The visual relative location indicator display on the graphical user interface may show a needle at a default position relative to a scale rendered on the display, wherein the default position corresponds to the initial signal strength value after the determining of the initial signal strength value of the tracking device beacon signal and the display updates the needle position relative to the displayed scale to correspond to the one or more updated signal strength values of the tracking device beacon signal relative to the default needle position rate after the determining of the one or more updated signal strength values of the tracking device beacon signal.

In an aspect, the mobile user equipment device does not use a calibration value that relates a given signal strength of the beacon with a distance from the mobile user equipment device to the tracking device to determine proximity of the mobile user equipment device to the tracking device. As discussed above, this avoids introducing inherent inaccuracies in using a calibration value to relate signal strength to actual distance in determine proximity to a tracking device.

In an aspect the beacon signal is a Bluetooth low energy beacon signal.

In an aspect, the computer instructions running on the UE cause a processor the UE to further perform the steps of determining, in response to receiving a command to detect the presence of tracking devices that are within a predetermined range of a current location of the UE wherein the displaying on the graphical user interface of the application of identifiers of one or more tracking devices associated with a user of the UE comprises displaying identifiers of tracking devices that are determined to be within the predetermined range of the UE. To determine the UE devices that are within a predetermined range of the current location of the UE at a given time, the UE may receive a devices-present message from a tracking server that maintains communication with, that can communicate with, or that can monitor communication from a fleet of tracking devices. The devices-present message may be based on location of devices that last reported their respective locations to the tracking server as being locations that the tracking server determines to be within the predetermined range of the current location of the UE.

In an aspect, the determining of the presence of tracking devices as being within the predetermined range of a current location of the UE may include detecting short-range wireless signals emitted from the tracking devices.

In an aspect, the computer instructions further cause the UE to perform the step of determining that the selected tracking device has been found based on a rate of change of beacon signal strength with respect to time exceeding a predetermined found_device_rate_change_criterion. In an aspect, the found_device_rate_change_criterion may be a signal strength rate rate of change criterion. In an aspect, the found_device_rate_change_criteron is a click rate rate of change criterion.

In an aspect a tracking device may automatically initiate a short-range beacon signal when its location is requested from long-range radio circuitry within the tracking device. The short-range beacon signal may be transmitted for either a predetermined time or a UE configurable time selected at the time of making the location request with the tracking application running on the UE.

In an aspect the tracking device may automatically initiate a short-range beacon signal when the projected battery energy reaches a value programmed into the tracking device that corresponds to a predetermined level or predetermined battery life level, for example, which may be a level that may no longer provide sufficient power to GNSS or long-range wireless radio components of the tracking device to support GNSS or long-range wireless communication from or to the tracking device.

In an aspect a tracking device may operate as part of a community of similar tracking devices. If a first tracking device is located outside of short range wireless communication range (i.e., outside of Bluetooth beacon range) of a UE device associated with it, a tracking application running on the user's UE device may be notified when another tracking device of the community of tracking device detects a beacon of the first tracking device. If a tracking application running on a second UE device that is not associated with the first tracking device but is associated with a second tracking device detects the beacon of the first tracking device, the UE device associated with the second tracking device may determine changes in signal strength associated with a beacon of the first tracking device. A UE device associated with the first tracking device may grant permission to the second UE device to enter a mode to determine changes in proximity to the first tracking device. When operating in such a mode, the second UE device may transmit change in signal strength levels and corresponding location information, such as longitude and latitude coordinates, to the first UE device. Or, the first UE may grant permission, either automatically, or based on a manual user input, to the second UE device to display, or otherwise indicate, that the second UE device is getting closer to or farther from the first tracking device, as discussed elsewhere here, such as by using a Geiger counter display and acoustic clicking indicator sound. The second UE may transmit a location determined by homing in on the location of the first tracking device to the first UE device so that a user there of can locate the first tracking device.

In an aspect the tracking device may automatically initiate a short-range beacon signal when its location is requested and other location determination methods cannot provide adequate or accurate enough location information as compared to a predetermined criteria, such as, for example, location information corresponding to the location of a tracking device in a parking deck because of poor GNSS signal reception from satellites. In such a scenario, a short range wireless component of the tracking device, such as Wi-Fi, may be unable to receive active Wi-Fi hotspot MAC address information signals and a GNSS receiver of the tracking device may be unable to provide latitude and longitude location information because it cannot receive signals from enough GNSS satellites. The short-range beacon signal may be transmitted for a predetermined time, or for a UE-configurable time selected at the time the location request was made. If the desired accuracy of an asset cannot be determined by the best methods available, for example if the Wi-Fi location is determined but the GNSS is unable to provide latitude and longitude location, the short-range beacon signal may be transmitted for a predetermined time, or a UE-configurable time selected at the time of the location request.

In an aspect the tracking device will automatically initiate a short-range beacon signal when the location is requested, and the resulting location may be determined to be a potential location of many similar tracking devices. For example, in a warehouse scenario multiple tracking devices may correspond to multiple packages, but operation according to a longer range of certain Bluetooth profiles, (i.e., not a Bluetooth Low Energy beacon profile), may provide a location of one among many packages that cannot be determined visually because accuracy when operating according to a longer range Bluetooth profile may not be as precise as needed to determine a location of a particular pack. Also, Near Field Communication ("NFC") tags may provide too short of a range since the tags typically only provide a location signal when an initiator is close to an NFC tag. Using a beacon to determine the location of a package may provide much higher accuracy than using a longer-range Bluetooth profile but may still provide a benefit over NFC tags because to locate a package using a NFC tag may require that an initiating device, such as a UE that has NFC capabilities, be practically touching the package, which would mean the package was already located, perhaps visually, without assistance from the NFC tag. A determination may be made based on predetermined location geofence, Wi-Fi hotspot identifier, or any other indicator either preprogrammed into a tracking device thru a tracking application running on a UE device or thru an ad hoc response message. For example, if the location of a tracking device is determined to be a warehouse based on geofence techniques that apply longer range wireless signals, the short-range beacon may then be activated to localize the tracking device to a specific area of the warehouse, thus homing in on the location of the package with high precisions after a lower precision location was determined using signals from longer range components of the tracking device.

BRIEF DESCRIPTION OF DRAWINGS

FIG. 6 illustrates a network environment for obtaining location information corresponding to a tracking device based on a desired accuracy.

FIG. 7 illustrates a flow diagram of a method for obtaining location information corresponding to a tracking device based on a desired accuracy.

DETAILED DESCRIPTION

As a preliminary matter, it will be readily understood by those persons skilled in the art that the present invention is susceptible of broad utility and application. Many methods, embodiments, and adaptations of the present invention other than those herein described as well as many variations, modifications and equivalent arrangements, will be apparent from or reasonably suggested by the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
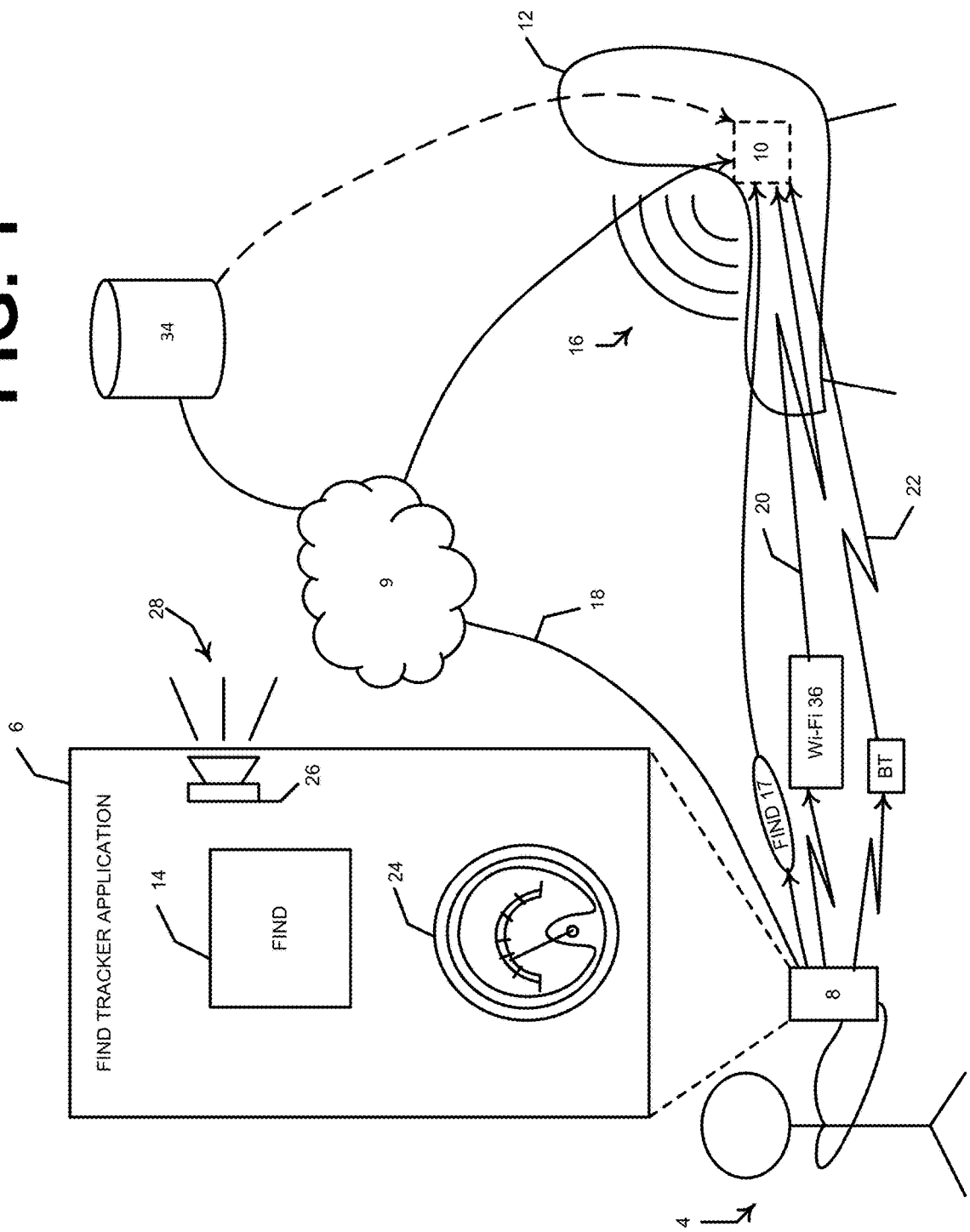
FIG. 1 illustrates an environment showing a system for assisting a user in attempting to find a tracking device lost in his, or her, sofa.

Turning now to FIG. 1, the figure illustrates a user environment 2, which may be a room in a house, wherein user 4 uses user application 6 running on user equipment device ("UE") 8, which may be a smart phone, to locate tracking device 10 that is shown lost in cushions of sofa 12. Tracking device may be a stand-alone device that may be attached to a personal item that uses 4 wishes to keep track of, for example a key ring, eyeglasses, etc. Tracking device 10 may also be part of another device, such as part of another UE. The figure shows application 6 as a graphical user interface that provides information to a user visually and also provides control items, such as buttons, toggle switches, drop down boxes, sliders, etc., that allows user 4 to input information to the application. User 4 presses Find button 14 of application 6 to request that tracking device 10 begin transmitting beacon 16. Beacon 16 may be a Bluetooth beacon, or similar short-range wireless beacon. Beacon may be a near field communication signal ("NFC") that is sent from tracking device 10 in response to an NFC initiation message signal emitted from UE 8. UE 8 may send Find message 17 to tracking device 10 via a long-range wireless link 18 such as, for example, an LTE cellular data connection. Or, application 6 running on smart phone 8 may send Find message 17 to tracking device 10 via a local Wi-Fi link 20 or a local Bluetooth link 22 that the UE has established with the tracking device. In the instance where beacon 16 is a Bluetooth beacon user equipment 8 uses a Bluetooth module or Bluetooth circuitry to detect beacon 16. User equipment 8 determines an initial signal strength value of beacon 16 and at predetermined periods after determining the initial signal strength value determines updated signal strength values. User equipment 8 may provide a visual indication such as icon 24, which in the figure appears as a gauge, or meter, of a Geiger counter. A needle on Geiger counter 24 may move relative to the signal strength value that corresponds to the signal strength of beacon 16. In addition to a visual indication of signal strength of beacon 16, acoustic transducer 26, for example a speaker, may emit in acoustic signal 28, or sound, that mimics clicks of a Geiger counter. The intensity of the clicks, either in terms of frequency, repetition rate, or volume, may vary in proportion to the initial signal strength value or one or more updated signal strength values. Thus, as user 4 moves about room 2 holding user equipment 8 audible clicks 28 or visual indication 24 provides information to the user that he, or she, is closer or farther from tracking device 10.

Figure 2:
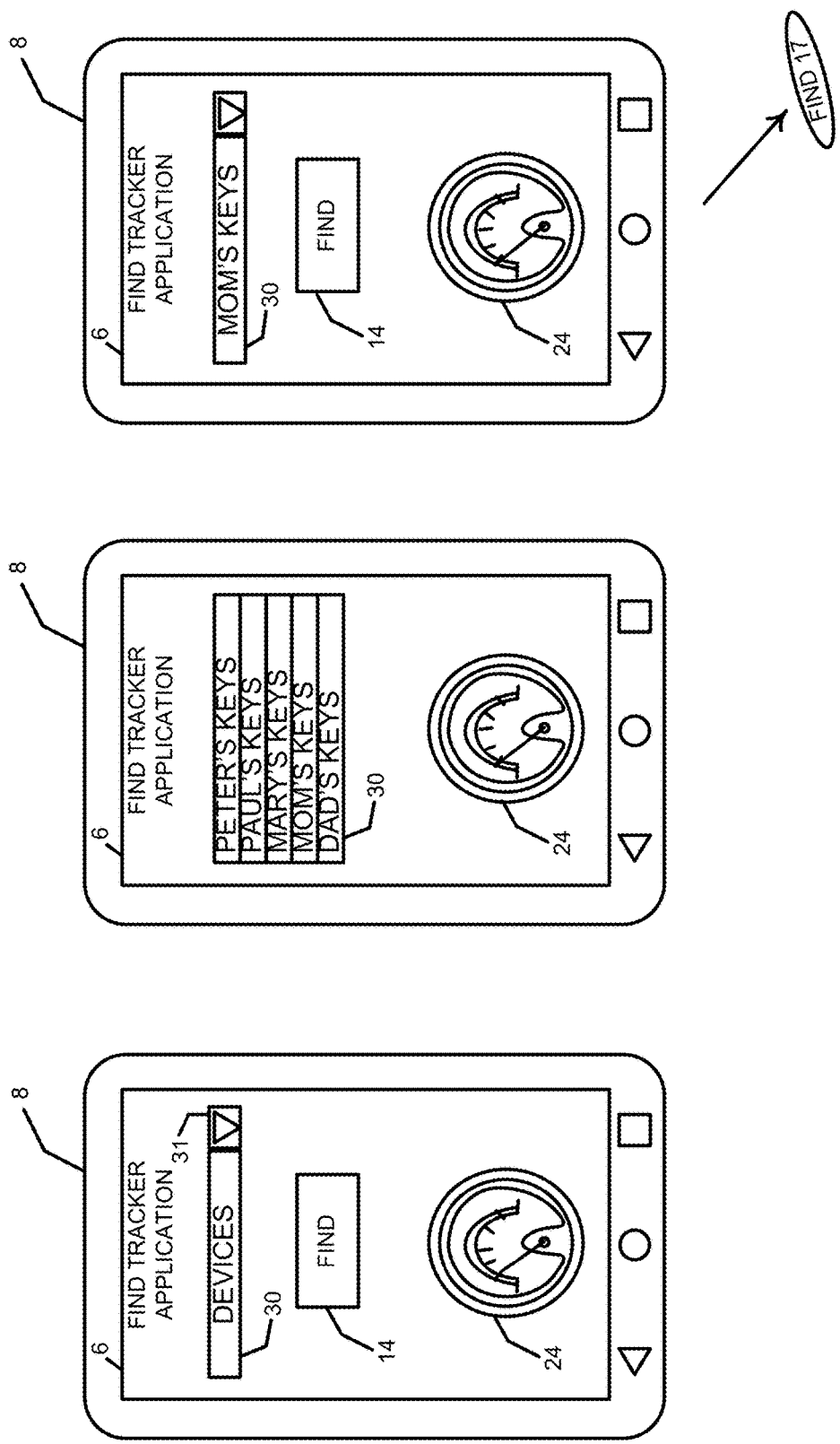
FIG. 2 illustrates user interface screens for selecting a tracking device to be found.

Turning now to FIG. 2, the figure illustrates a progression of steps as a user of application interface 6 seeks to find a certain set of keys on a particular key ring. In FIG. 2A Find Tracker interface 6 shows a dropdown box 30 with dropdown button 31. If a user selects button 31 pre-programmed list of identifications of users' keys may be displayed as shown in FIG. 2B. In the example the user seeks to find mom's keys and selects the control item corresponding to Mom's Keys 32 shown in FIG. 2B. Upon selecting control item 32 dropdown box collapses as shown in FIG. 2C and user 4 may press Find Button 14 as shown in FIG. 2C. In an aspect, instead of, or in addition to, alphanumeric characters (i.e., words or number) representing different tracking devices, icons that represent different tracking devices may be displayed in a list that a user may select a tracking device from. In an aspect, a user may speak the name of a tracking device to select it as a device to be found. In another aspect, when the user selects the specific tracking device, the tracking application interface 6 may present a secondary box, or other means for entering information into a UE, such as a dropdown box or voice input to allow the user to configure, or adjust, a beacon 'active time' by providing a beacon active time value via the tracking application interface. 'Beacon active' time may refer to a period during which a user estimates that the beacon should stay active and should be broadcast. In an aspect, the active time value may be selected automatically by UE 8 or by tracking server 34 based on the type of item to be located or based on the location scenario of the item to be located, which type of item to be located and location scenario may be input by a user or may be determined by the UE or server based on an identifier corresponding to the item to be location or the last known (known to the UE or to the server) location of the item to be located. For example, if a user is searching for a key chain or wallet in his, or her, residence that has a tracking device in it, on it, attached to it, or otherwise associated with it, a user may select a beacon active time of five minutes, based on the assumption that if the item to be found cannot be located in the residence within the selected active time the item, or at least the tracking device associated with it, is not in the residence. In another example location scenario, if a user is searching for a vehicle that is stored in a garage among a plurality of garages that may be spread out enough to require a substantial amount of walking to bring a UE that the user is carrying within range of a beacon, the user may select an active time of ten minutes, based on the assumption that searching for the vehicle will likely take longer to walk near enough to the target vehicle to detect a beacon than it would take to walk around a residence in search of a misplaced keychain. By selecting an appropriate active time value using a tracking application, the beacon of the resident tracking device to be located is active and broadcasting for an appropriate amount of time without causing the beacon to say active longer than likely necessary to locate the tracking device thus minimizing use of battery power from a battery of the tracking device.

Upon pressing Find Button 14, UE 8 transmits Find message 17 to a particular tracking device corresponding to Mom's keys (i.e., a particular tracking device attached to, or part of Mom's keys or key ring. In an aspect, the tracking device may be, or may be part of, a key fob, such as may be used to start a vehicle. Find message 17 that corresponds to Mom's keys may include a unique identifier of the tracking device corresponding to Mom's keys. The unique identifier of the tracking device may be a long-range wireless networking identifier, such as an International Mobile Subscriber Identity number ("IMSI"), a telephone number, an IP address, a friendly name, and the like. Find message 17 may include a requested, or predetermined, beacon active time. UE 8 may transmit Find message 17 via a long-range wireless communication link, such as a cellular telephone network such as an LTE network. Network 9 may refer to a long-range wireless network, the internet, or a combination thereof. In such a scenario, a mobile network operator ("MNO") of the long-range wireless network may receive Find message 17 and cross reference the unique identifier of the tracking device corresponding to mom's keys and transmit a message to the mom's keys tracking device requesting that the tracking device begin emitting a beacon, such as a Bluetooth beacon. In an aspect, instead of the MNO determining the tracking device to transmit Find message 17 to, the MNO may receive and forward Find message 17 to a tracking server 34 (Shown in FIG. 1) operated by a tracking device services provider. The tracking server would then determine the tracking device to send Find message 17 to and would forward the Find message to the corresponding tracking device. Tracking server 34 may forward Find message 17 to the mom's keys tracking device based on an network address, such as an IP address, of the tracking device, or based on a long range wireless identifier, such as an IMSI or telephone number corresponding to long range wireless circuitry of the tracking device.

In an aspect, if Find message 17 is forwarded according to a network address, tracking server 34 may forward the Find message to the tracking device corresponding to mom's keys to the MNO's wireless network for forwarding to the tracking device via the MNO's wireless network.

In an aspect, if application interface 6 causes UE 8 to forward Find message 17 directly to the tracking device corresponding to mom's keys, the UE may, instead of sending the Find message to the MNO's wireless network, transmit the Find message according to a network address of the tracking device over Wi-Fi link 20 via a local Wi-Fi hot spot, or router, 36 (shown in FIG. 1) that is located in home 2.

In an aspect, if application interface 6 causes UE 8 to forward Find message 17 directly to the tracking device corresponding to mom's keys, the UE may transmit the Find message according to an identifier of the tracking device, such as a friendly name, for example a BlueTooth friendly name or BlueTooth identifier, over Bluetooth link 22.

Figure 3:
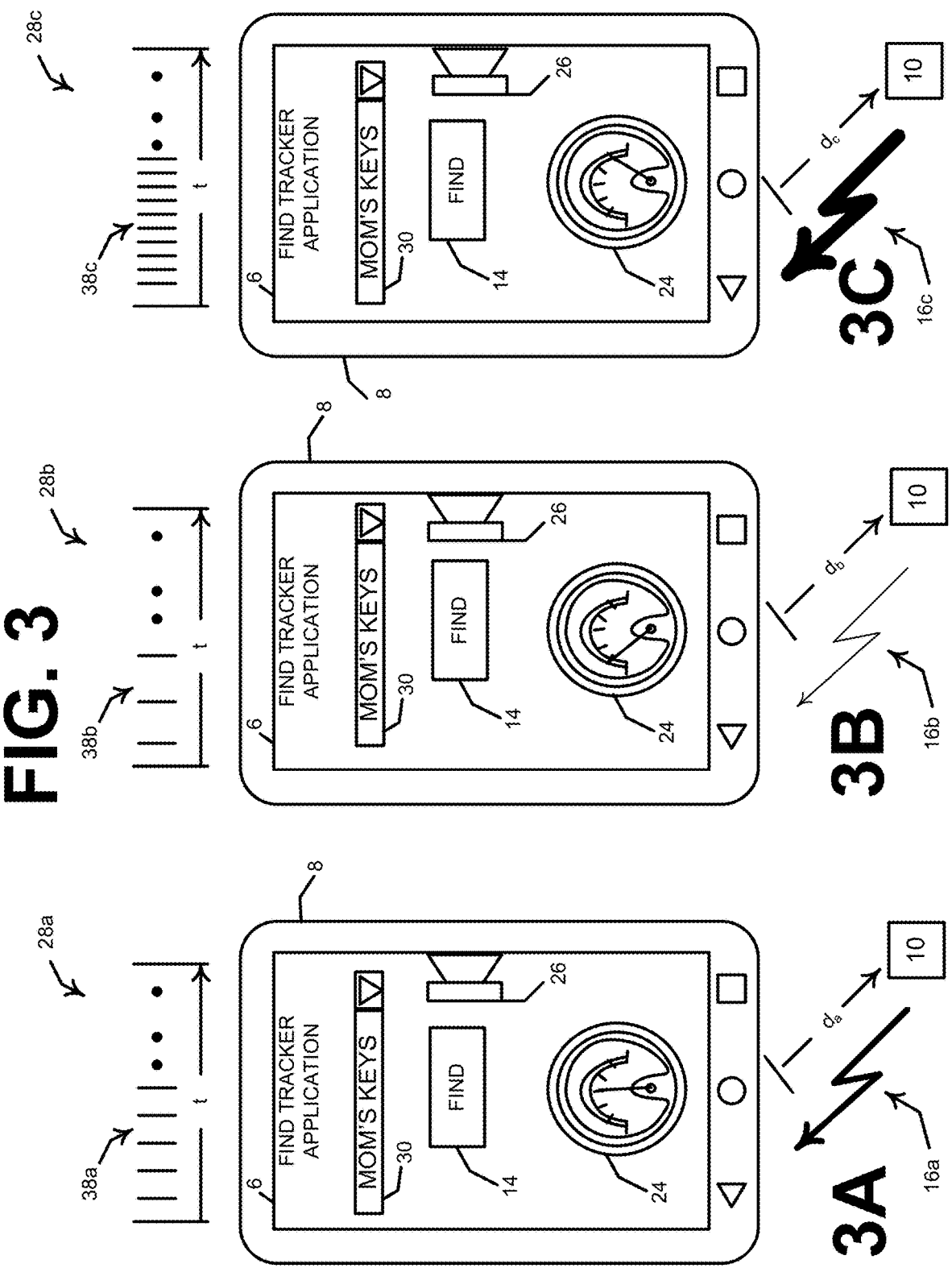
FIG. 3 illustrates visual and audible indications of distance at a given position to a tracking device to be found relative to a previous position.

Turning now to FIG. 3, FIG. 3A illustrates user interface 6 running on user equipment 8 detecting beacon 16a. As shown in the figure the link symbol indicating beacon 16A has a medium weight indicating a default signal strength value of a beacon received from tracking device 10 at distance $d_a$ after a user pressed Find button 14. Geiger counter 24 is shown with the needle pointing in a middle position, and repeating audible clicks 28a emitting from speaker 26 is shown at an initial, or default, rate with initial, or default, spacing between clicks 38a. For purposes of discuss, tracking device 10 will be understood to refer to 'mom's keys' to continue the example referred to in reference to the description of FIG. 2.

In FIG. 3B, the user has moved UE 8 from the position (i.e. position 'a'), at which it received beacon 16a at an initial signal strength, to position 'b,' which may be referred to as an updated position At updated position 'b' UE 8 is farther from tracking device 10 at distance $d_b$ as indicated by link symbol 16b in FIG. 3B being lighter in weight (indicating weaker signal strength received at UE 8) that the weight of link 16a shown in FIG. 3A. As a result, the needle of Geiger counter 24 has moved to the left to indicate, based on the updated received signal strength value of link 16b being lower than that of link 16a, that the distance $d_b$ from UE 8 to tracking device 10 has increased compared to distance $d_a$ at the initial position 'a' based on the reduction of received signal strength of link 16b compared to the strength of the received signal represented by link 16a. Repeating audible clicks 28b emitting from speaker 26 is shown at an updated rate with updated spacing between clicks 38b being farther apart with respect to time (t), thus indicating that UE 8 is farther from tracking device 10 at updated position 'b' than when it was at initial position 'a.'

In FIG. 3C, the user has moved UE 8 to position 'c,' which may also be referred to as an updated position. Position 'c' may be a first updated position after the initial position 'a' or it may be an updated position that a user moved UE 8 to after being in updated position 'b.' In updated position 'c' the distance $d_c$ from UE 8 to tracking device 10 is closer than when the UE was at position 'a' or 'b' as indicated by link symbol 16c in FIG. 3C being heavier in weight (indicating stronger signal strength received at UE 8) than the weight of links 16a or 16b shown in FIGS. 3A and 3B, respectively. As a result, the needle of Geiger counter 24 has moved to the right to indicate, based on the updated received signal strength value of link 16c being higher, that the distance $d_c$ from UE 8 to tracking device 10 has decreased compared to the distance $d_a$ at the initial position 'a' or distance $d_b$ at the updated position 'b' based on the increase in received signal strength of link 16c compared to the received signal strengths at positions a or b represented by links 16a or 16b, respectively. Repeating audible clicks 28c emitting from speaker 26 is shown at an updated rate with updated spacing between clicks 38c being closer together with respect to time (t), thus indicating that UE 8 is closer to tracking device 10 at updated position 'c' than when it was at positions 'a' or 'b.'

Figure 4:
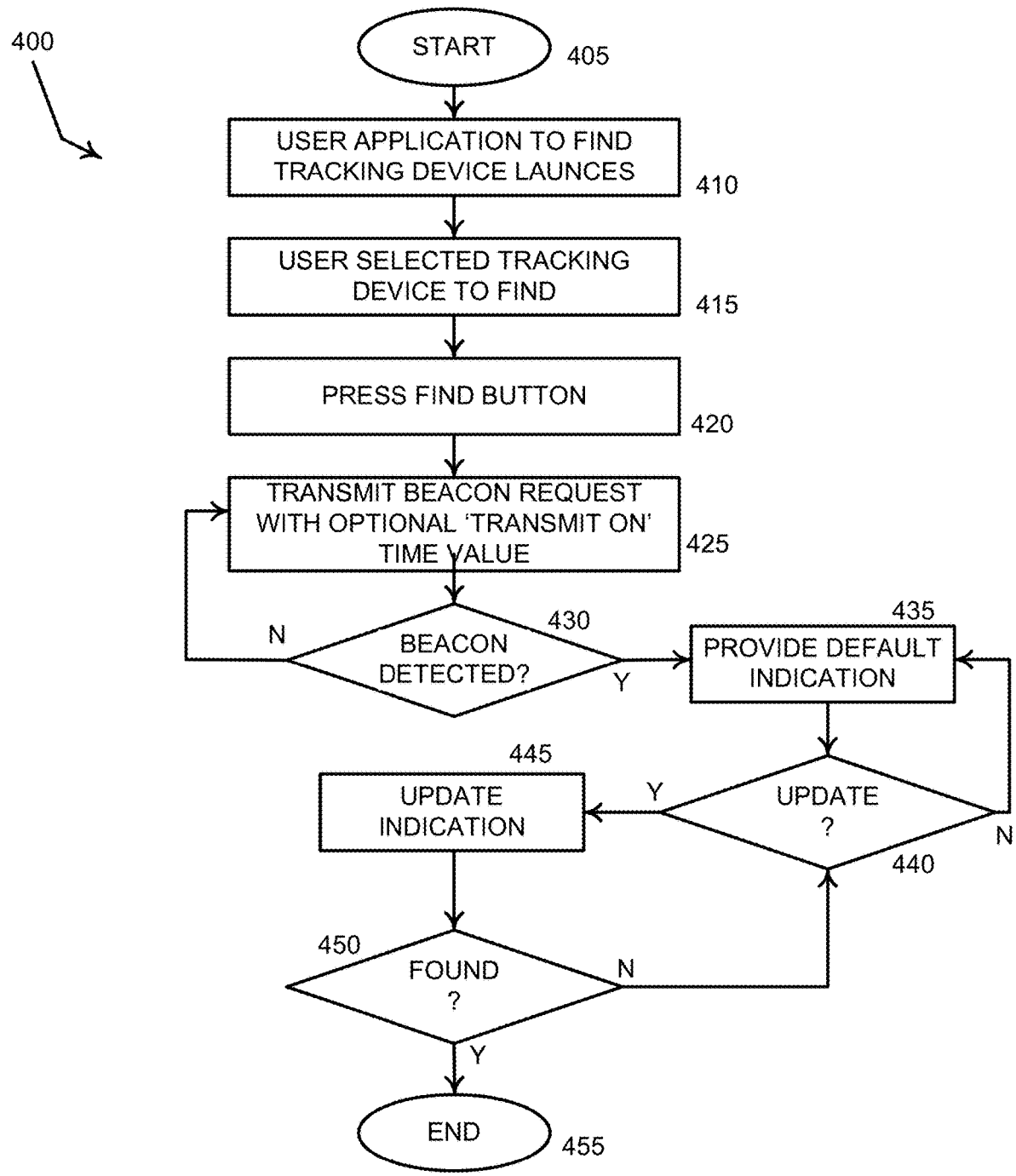
FIG. 4 illustrates a flow diagram of a method for locating a tracking device with a UE.

Turning now to FIG. 4, the figure illustrates a flow diagram of a method 400 to use a user application running on a UE to find a tracking device. Method 400 begins at step 405. At step 410, an application to find a particular tracking device is launched on a UE. A user using the UE may cause the launching of the Find Tracking Device application, the application may launch automatically if the tracking device has not reported its location for a predetermined period, either to the UE itself or to a network component, such as a tracking device server located remotely from where the tracking device or UE are located. The Find Tracking Device application may be launched remotely from the UE if a user, either the user of the UE, another user associated with the tracking device, or an administrator associated with a tracking service that monitors locations of tracking devices, including the tracking device to be found.

After the Find Tracking Device has been launched, a user selects a tracking device to be found at step 415. Instead of a user of the UE running the Find Tracking Device application selecting a tracking device to be found, a tracking device server may include a tracking device identifier in a message sent from a remote server over a communications network (e.g., a wireless communication network such as an LTE network, a wired network that includes a wired internet connection to a short-range wireless hot spot or router that the UE is connected to, or to the UE itself) to the UE instructing the UE to find the tracking device associated with the tracking device identifier included in the received message.

The user may select a tracking device to be found by selecting from a list provided by the Find Tracking Device application, by manually entering an identifier of the tracking device (the identifier may be a unique identifier such as an IMSI, MAC ID, phone number, or may be a friendly name that is not necessarily unique in the world but is unlikely to be used by more than one device in the proximity of a short range wireless beacon signal emitted from the tracking device to be found.

After selecting the tracking device to be found, the user causes the Find Tracking Device application to send a beacon request message by pressing a Find tracking device button at step 420. Instead of pressing a button provided by the Find Tracking Device application, the user may speak a command to the UE, which may receive the command via a microphone and translate the voice command into a command to find the device to be found and forward said command to the Find Tracking Device application.

At step 425 the Find Tracking Device application receives the command to find a particular tracking device and transmits a beacon request message. The beacon request message may include an optional transmit 'on' time value or transmit 'active time' As described above in reference to the meaning of 'active time.' The transmit on time value, or active time value, may control the beacon transmitter of the particular tracking device for which the request is intended such that the beacon is not 'on' and transmitting constantly. The transmit on time may cause the beacon to transmit at a periodic rate, for a predetermined period and then shut off until another request message is generated, or until a trigger, such as a 'not found yet' message is generated, such as by the Find Tracking Device application, when the application has not been notified, either electronically or manually from a user input, that the tracking device has been found within a predetermined period after the request message was generated The beacon request may include a beacon request message, that may be transmitted in a variety of ways, intended to be received by the tracking device to be found. The beacon request message may be transmitted via a short-range wireless link, such as, for example, a Bluetooth link, a Wi-Fi link, or the like. The Find Tracking Device application may attempt such a direct form of communicating the beacon request message to avoid using a long-range wireless network for transmitting a message to a device that may be only a few feet away from the UE that the Find Tracking Device application is running on. Or, the beacon request may be transmitted via a long-range wireless network. The Find Tracking Device application may choose to use a long-range wireless network as a first choice, or may attempt to use the long range wireless if a more direct means of communicating over a short range wireless link was unsuccessful. The Find Tracking Device application may deem an attempt to use short range wireless link to transmit the beacon request message as unsuccessful if the UE the application is running on does not indicate that a beacon has been detected from the tracking device to be found within a predetermined period. If a tracking device server initiated the launching of the Find Tracking Device application at step 410, the tracking device to be found may have already received a command, from the tracking server or from another device controlled by the tracking server, to turn on its beacon for a predetermined time or for a configurable amount of time, such as for a predetermined 'active time.'

At step 430, the Find Tracking Device application checks to determine whether the UE the application is running on has detected a beacon signal from the tracking device to be found. If the Find Tracking Device application does not receive an indication from the UE within a predetermined period that the US has detected a beacon signal from the tracking device to be found, method 400 returns to step 425 and the application causes the UE to transmit another beacon request message.

When the Find Tracking Device application receives an indication from the UE it is running on that the UE detected a beacon signal from the tracking device to be found, method 400 advances to step 435 and provides one or more default indications. Default indications may include a default visual indication of the strength of a beacon signal received from the tracking device to be found. The default visual indication may be in the form of a Geiger counter icon displayed by an interface of the Find Tracking Device application. The Find Tracking Device application may display the Geiger counter icon with a needle against a graduated scale background, wherein the needle is displayed in a default, or initial needle position that corresponds to a first rendering, or displaying, of the default visual indication. The default, or initial, needle position may be independent of the strength of the beacon signal received from the tracking device to be found. For example, regardless of the strength of the beacon signal received from by the UE from the tracking device to be found, the default, or initial, position of the needle of the displayed Geiger counter may be in the middle of a displayed scale, such that it appears to a user of the UE that the needle could move equally to a left maximum deflection or to a right maximum from the initial position. Accordingly, in an aspect, the Geiger counter needle displayed by the Find Tracking Device application moves based on a comparison of updated signal strength sample values (as discussed below in reference to step 440) to the initial strength value of the signal received from the tracking device's beacon at step 430. Thus, calibration in the UE of the signal strength to distance of the UE to the tracking device beacon is not necessary.

Default indications may include a default audible indication, emanating from a speaker of the UE that is running the Find Tracking Device application, of the strength of a beacon signal received from the tracking device to be found. The default audible indication may be in the form of multiple clicks that imitate, or sound like, clicks of a Geiger counter. The default audible clicks may be produced at a default rate (i.e., a default period between audible clicks). The default rate may be independent of the strength of the beacon signal received from the tracking device to be found such that calibration of the UE is not necessary, as discussed above in reference to the visual indication.

At step 440, the Find Tracking Device application may determine whether to update the visual or audible indications from the default, or initial, indications. The determination whether to update the indications may be based on the passing of a predetermined update period (i.e., time between samples at a given predetermined sample rate). The predetermined update period may be referred to as a sample rate, or a rate at which the Find Tracking Device application makes another evaluation of the strength of the beacon signa received from the tracking device. Thus, the Find Tracking Device application may periodically determine at a predetermined update sample period, or rate, a value of the signal strength of the beacon signal received by the UE from the tracking device to be found. At each periodic update the Find Tracking Device application my provide updated visual or audible indications at step 445.

In an aspect, the Find Tracking Device application may determine to update the visual or audible indications from the initial indications based on a change in location as reported by the UE that the application is running on. The UE may determine a change in its location based on a variety of methods, including using GNSS information, cell tower triangulation, evaluation of the strength of a beacon signal from another device than the tracking device to be found, and the like. Thus, instead of determining to provide updated visual or audible indication merely because of the passage of time, the Find Tracking Device application may only determine updated visual or audible indications when the position of the UE has changed after the passing of a given update period. However, to minimize power use in the UE, it may be advantageous to provide updated visual or audible indication merely because of the passage of time to avoid using GNSS circuitry in the UE. Thus, the Find Tracking Device application may provide a control item (e.g., a toggle switch) to turn on or off the updating of the visual or audible indication based on location of the UE.

In another aspect, the Find Tracking Device application may determine to update the visual or audible indications from the initial indications based on the user pressing a button on the UE interface.

If at step 445 the Find Tracking Device application determines that the UE that the application is running on has changed positions relative its position at a previous sample evaluation was made after a previous iteration of step 440, the application evaluates the signal strength of the beacon signal received from the tracking device to be found. It will be appreciated that the application may perform an updated evaluation of the received beacons signal strength merely because the predetermined sample period as determined at step 440 has expired without making a determination that the UE has changed positions relative to the initial position it was located at when step 430 was performed or the location it was at when a previous updated position was determined at step 445.

Continuing with discussion of step 445, the Find Tracking Device application may cause the Geiger counter needle to change positions based on the strength of the beacons signal received from the tracking device to be found. The Find Tracking Device application may use a minimum signal strength value corresponding to an estimated maximum beacon signal range to determine the scale of movement of the Geiger counter needle or to determine the click rate of the audible indication. For example, if a UE nominally receives a beacon from a tracking device with signal strength of −100 dB when the UE is 100 feet from the tracking device and with a signal strength of −35 dB when the UE is 0 feet from the tracking device emitting the beacon, the Find Tracking Device application may assume that −70 dB is roughly a midpoint. Thus, the Find Tracking Device application would provide for a displayed needle deflection of up to approximately 30 dB to the left when the UE that the Find Tracking Device application is running on is at a distance farther from the initial position where the UE was located at steps 430 and 435 (typically step 435 would execute within a predetermined period before an updated sample of the beacon signal is evaluated), and a displayed needle deflection of up to approximately 35 dB to the right when the UE is at a distance closer to the tracking device than the initial position where the UE was located at steps 430 and 435. It will be appreciated that this changing of the displayed scale to match a given strength of signal is not the same as calibrating the UE such that it can provide a distance to a tracking device based on the beacon signal's strength. The position of the displayed needle relative to the displayed scale does not indicate a specific distance to the tracking device. The position of the needle only indicates a position of the UE relative to the tracking device and relative to a previous position of the UE relative to the tracking device. In other words, movement of the displayed Geiger counter needs indicates changes in distance from the UE to the tracking device without using calibration coefficients in the UE to first calculate distance and then determine based on the calculated distance, if a change has occurred.

It will be appreciated that the UE may not be at a midpoint of a beacon's effective range at step 430 when the initial visual indication is produced by the application. Thus, for example, if the UE is located near the maximum extent of the beacons range, for example 100 feet, at step 430 the needle of the displayed Geiger counter may not move much to the left if the UE is farther from the tracking device when an update is made at step 445. Or, if for example, if the UE is located near the tracking device to be found, for example 10 feet, at step 430 the needle of the displayed Geiger counter may not move much past a predetermined maximum deflection to the right if the UE is very close to the tracking device (e.g., one inch) when an update is made at step 445.

In an alternative aspect, the Find Tracking Device application may automatically adjust the scale displayed on the Geiger counter such that the needle is shown close to the left-most extent on the displayed scale when the UE running the Find Tracking Device application determines after one or more updated evaluations of signal strength at step 445 that the initial indication rendered at step 435 was the result of an initial detection of the tracking devices beacon at a distance near the maximum range of the beacon signal.

In a similar alternative aspect, the Find Tracking Device application may automatically adjust the scale displayed on the Geiger counter such that the needle is shown close to the right-most extent on the displayed scale when the UE running the Find Tracking Device application determines after one or more updated evaluations of signal strength at step 445 that the initial indication rendered at step 435 was the result of an initial detection of the tracking devices beacon at a distance near) the tracking device emitting the beacon signal (e.g., closer than an approximate midpoint of a beacon's effective range.

In another aspect, if at step 445 the Find Tracking Device application determines that the UE that the application is running on has changed positions relative to the position it was in at a previous signal strength evaluation sample that occurred after a previous iteration of steps 440/445, (or merely that the sample period as determined at step 440 has expired without regard to whether the UE has changed positions since a previous iteration of step 445) the application evaluates the signal strength of the beacon signal received from the tracking device to be found. The Find Tracking Device application may cause the UE to produce an audible indication that sounds like Geiger counter clicks at a click rate that is different from the default, or initial, click rate, that may have been produced at step 435.

As an example, a default click rate, or an initial click rate, produced at step 435 may be four clicks per second. If the Find Tracking Device application determines at step 445 that the location of the UE is farther from the tracking device than it was at step 430 (or at a previous iteration of step 445) based on relative strengths of the beacon's signal received by the UE at steps 445 and 430 (or at a prevision iteration of step 445), the application may cause the audible indication of Geiger counter clicks to click at an updated click rate that is slower (i.e., clicks are spaced farther apart with respect to time) than the initial click rate (or a previous updated click rate). Or, if the Find Tracking Device application determines at step 445 that the location of the UE is closer to the tracking device than it was at step 430 (or at a previous iteration of step 445) based on relative strengths of the beacon's signal received by the UE at steps 445 and 430 (or at a previous iteration of step 445), the application may cause the audible indication of Geiger counter clicks to click at an updated click rate that is faster (i.e., clicks are spaced closer to each other with respect to time) than the initial click rate (or a previous updated click rate).

It will be appreciated that because the click rate is an audible sound indication rather than a display of a needle moving across a displayed scale, as with the Geiger counter display, adjusting of a scale (in the case of audible clicks that are produced a given rate) may not be necessary because there is no visual limitation of the scale. In other words, an initial click rate could be four clicks per second if the UE running the Find Tracking Device application is located near the maximum range of a tracking device's beacon signal. As the UE changes positions and updated click rates are generated at step 445, the click rate could get faster and faster without a maximum rate limit (i.e., a minimum spacing between clicks with respect to time). Similarly, if the UE running the Find Tracking Device application is located close to the tracking device at step 430, the initial click rate provided at step 435 may still be four clicks per second and the click rate would change at later-occurring iterations of step 445, regardless of how far the UE moves away from the tracking device to be found. Thus, unlike the aspect of the Geiger counter visual indication that starts with the needle in an initial position of midway on the displayed scale, in an aspect of the audible indication there is not necessarily a 'midpoint' click rate that roughly corresponds to an approximate mid-range location based on a signal strength value being, for example, about −70 dB. In this aspect of the audible indication, the initial rate will always be the same regardless of the signal strength value of a beacon signals detected by, or received by, the UE. In another aspect of the audible indication, the initial click rate may be altered from a default initial rate based on signal strength, much like the displayed scale of the Geiger counter visual indication may change based on a signal strength value. In the audible aspect, instead of the initial click rate being a default rate of, for example, four clicks per second when the signal strength value of the received signal is −90 dB (indicating a position of the UE relative to the tracking device near the maximum range of the beacons signal), the initial click rate may be adjusted to two clicks per second instead of the default initial rate of four clicks per second. Likewise, if the signal strength value of the received signal is −50 dB (indicating a position of the UE relative to the tracking device closer than an approximate midpoint of the beacon's signal range), the initial click rate may be adjusted to ten clicks per second instead of the default initial rate of four clicks per second.

After each iteration of step 445, method 400 advances to step 450 where the Find Tracking Device application determines whether a user has selected a control item (e.g., pressing a 'Found' button in the user interface 6) indicating that he, or she, has found the tracking device. If such an indication has not been made by a user, method 400 returns to step 440 and performs at step 445 a new updated evaluation of the signal strength value of the beacon signal received by the US from the tracking device. If an indication has been received that the tracking device to be found has been found, method 400 advances from step 450 and ends at step 455. Instead of a user selecting a 'Found' button at step 450, in another aspect, an indication that the tracking device to be found has in fact been found could result from a user touching the tracking device to the UE, or bringing it within a predetermine 'found' range (typically about two inches) such that near field communication ("NFC") devices within the tracking device and the UE communicate, thus indicating to the UE that the tracking device has been found without requiring human intervention to indicate that the tracking device has been found.

Alternatively, in another aspect, instead of using NFC technology to indicate to the UE, and thus to the Find Tracking Device application, that the tracking device to be fond has been found, the application may compare at step 450 the most recent strength value corresponding to the tracking device beacon signal received by the UE as determine at step 445, with one or more previous determinations of signal strength values. In an aspect, instead of comparing the most recent signal strength value with one or more previous signal strength values as determined at step 445, the Find Tracking Device application may compare the most recent updated click rate to one or more previously determined updated click rates, as determined at step 445 and one or more previous iterations of step 445, respectively. Both of these aspects of comparing signal strength values or updated click rates to one or more previous signal strength values or updated click rates to determine that the UE running the Find Tracking Device application has touched, or come very close to the tracking device to be found without using NFC techniques takes advantage of the logarithmic nature of the change of a beacon's signal strength (and thus the updated click rates) relative to a corresponding change in distance between the device detecting the beacon signal and the source of the beacon signal, as shown in FIG. 5.

Even though UE 8 and the Find Tracking Device application 6 are not calibrated to a tracking device's 10 beacon signal so that an absolute distance from the tracking device can be determined, because signal strength values in terms of dB do not change in a linear relationship to a change is distance between a beacon detector and beacon source, if the Find Tracking Device application changes the click rate of the Geiger counter indicator at step 445 based on the numerical signal strength value in terms of dB, the application can determine that a rapid rate of change in click rate, or signal strength value in terms of dB, when the click rate is already high relative to the initial click rate, is an indication that the UE that is detecting the beacon signal has been moved very close, or has touched, the device emitting the beacon signal.

Figure 5:
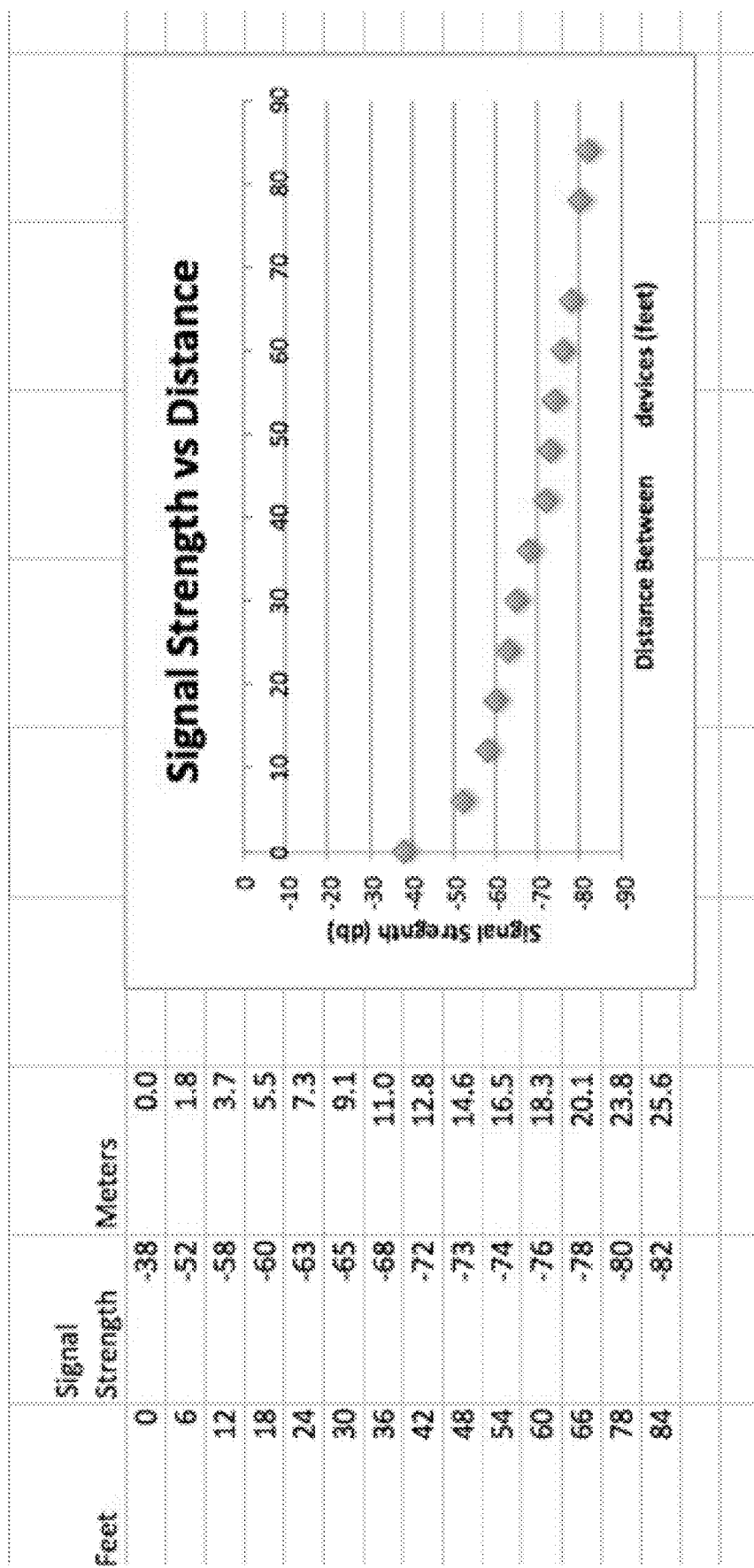
FIG. 5 illustrates a plot of a signal strength versus distance curve for a beacon signal emitted from a tracking device and detected at a UE.

For example, as shown in FIG. 5, a change in distance between devices from 18 feet to about 6 feet results in a signal strength change from about −60 dB to −52 for a numerical change of 8 dB, whereas a change in distance from 6 feet to 0 foot results in a signal strength change from about −52 dB to −38. A change of 12 feet when the devices started 18 feet apart resulted in a numerical signal strength change of 8 dB whereas a change of only 6 feet when the devices started 6 feet apart resulted in a numerical change in signal strength of 14 dB. Thus, for a constant rate of change of distance (i.e., velocity) as the source and detector devices come closer, the closer the devices are the more rapidly the rate of change of the numerical signal strength values. If the click rate of the audible indication is based linearly on the signal strength value in terms of dB (e.g., click rate=signal strength−dB/10), the Find Tracking Device application may assume that if the click rate changes, or the signal strength values changes, faster than a predetermined change criteria (may be referred to as a found_device_rate_change_criteron) that corresponds to the type of beacon signal, that the devices have touched or are about to touch, and method 400 may assume without human intervention that the tracking device has been found at step 450. For example, using the plotted data shown in FIG. 5, if two devices are coming together at a rate of 1 ft/sec, then the signal strength change between 18 feet and 6 feet is (8 dB/(18-6) sec), or 0.67 dB/sec.

If the devices continue coming together at a rate of 1 ft/sec, then the signal strength change between 6 feet and 0 feet is (14 dB/(6−0) sec), or 2.33 dB/sec. Although the data shown in FIG. 5 doesn't show a point of the distance between devices between 6 and 0 feet, it will be appreciated that the signal strength rate of change from, for example, 4 feet to 0 foot would be higher than 2.33 dB/sec, assuming a closing velocity of the UE to the tracking device of 1 ft/sec. Accordingly, a value higher than 2.33 dB/sec (e.g., 4 dB sec) could be chosen as a signal strength rate of change criterion, or as a basis for a click rate rate of change criterion, for use at step 450 of determining that the devices have touched or are about to touch. It will be appreciated that an update rate for performing iterations of steps 440, 445, and 450 should be selected to provide adequate resolution of determining the signal strength rate of change or the click rate rate of change.

It will be appreciated that calibration of the signal strength to distance for a given beacon/tracking device is not needed. Calibration between signal strength and distance for Bluetooth beacons are notoriously inaccurate. Moreover, to the extent a UE were to be calibrated to a given beacon signal for future use in locating a device that is emitting the beacon signal, degradation of battery output in the tracking device could alter the power output of the beacon radio circuitry, thus adding further inaccuracy. Providing changeable visual or audible indications of the location of a UE to a tracking device based on changes in signal strength from one position to another instead of based on absolute signal strength at different distances from a tracking device, provides very accurate guidance to a misplaced or lost tracking device regardless of a beacon's signal strength, calibration inaccuracies, environmental conditions, etc.

It will be appreciated that establishing a predetermined change rate criterion for comparing to a change in click rate or signal strength value at step 450 is not considered a distance calibration because an actual measurement of distance is not being performed by method 400. Although it may be advantageous to obtain actual data for a given beacon type and beacon detector type similar to the data shown in FIG. 5 for use in determining a predetermined click rate change criteria or signal strength change criteria for use at step 450, such obtaining of information should not be considered undue experimentation. Since signal strength versus distance characteristics may vary depending on beacon type and detector type, a one-time acquiring of data may be performed to establish a signal strength vs. distance curve for a given combination of beacon source type (i.e., tracking device type or model) and beacon detector type (i.e., a given UE type or model). Such data could likely be accomplished within a few hours and would be applicable in thousands of UE devices detecting a similar beacon type (i.e., Bluetooth Low Energy).

Turning now to FIG. 6, the figure illustrates a network environment 39 for facilitating user tracking application 6 running on UE smart phone 8 obtaining location information of tracking device 10. Environment 39 includes tracking server 34 coupled to communication network 9, which may be the internet, a Local area network, a wide area network, and the like. as discussed in reference to previous figures. Tracking server 34 may include, for example, a publish/subscribe ("pub/sub") server that facilitates forwarding of message between UE 8, tracking device 10, location information server/data store 46, and ephemeris server 48. It will be appreciated that preferable pub/sub server 34 does not store location information corresponding to tracking device 40, except to the extend it needs to buffer location information received from data store 46 or server 48 before forwarding to UE 8.

Tracking the device 10 is shown with long range wireless module processor 40, a GNSS module 42, Wi-Fi module 44, and Bluetooth module 50. Preferably, Wi-Fi module 44 operates as a receiver only. Bluetooth module 50, preferably operates as a transceiver thus he can send and receive messages. GNSS module 42 typically operates only as a receiver. Bluetooth module 50 may provide beacon signal 16 from tracking device, thus it may receive and transmit message signals.

Tracking application 6 is shown with an accuracy selector slider control item 46. Slider 46 allows a user to select a desired accuracy of location information. Slider 6 is shown selected at a midpoint of the slider to represent a selection of medium accuracy desired. Selecting a low level of accuracy typically allows a location information server 46, as operated, for example, by Google, Unwired Labs, Combain, etc., to use Wi-Fi hot spot information transmitted by tracking device 10 in response to a location request message to determine latitude and longitude location information and an accuracy level preference associated with the latitude and longitude coordinates. Location information server 46 returns the latitude, longitude, (and perhaps elevation), and the accuracy level associated with the location information to server 34. Server 34 may decide whether the accuracy information returned from server 46 meets the requirements of the desired accuracy level selected with slider 46. It will be appreciated that server 34 may store an accuracy preference in association with UE 8 such that use of slider 46 by a user is not necessary.

In an aspect, slider 46 is not available to a user to select an accuracy level preference based on the nature of the asset, item, animal, or person being tracked by tracking device 10. For example, if tracking device is used to track an autistic person, and location information is retrieved multiple times per day, it is probably preferable to associate a low level of accuracy with tracking device 10 because a person who wanders away from an establishment where he, or she, is supposed to be (i.e., a school building or hospital), not using GNSS module 42 is an advantage to minimize depletion of charge of battery 51 and the typically lower accuracy levels (as compared to accuracy associated with obtaining coordinates from the GNSS module) associated with location coordinates being based just on identifiers of Wi-Fi hot spot(s) that the tracking device is in the presence of when a user seeks to locate the tracking device is acceptable. If the accuracy level associated with just using Wi-Fi hot spot identifiers is 200 feet, this would likely be accurate enough to determine if the person being tracked is at the premises where he, or she, is supposed to be. Thus, GNSS module 42 is not turned on and the person may be easily found, even if the information returned from server 46 is only accurate to within 200 feet. On the other hand, in other scenarios a user may benefit from having more accurate location information than can be determined by server 46 based on Wi-Fi hot spots that an item to be tracked may be close to when the user requests the location of the tracking device. For example, an automobile manufacturer may have hundreds, or even thousands, of vehicles parked in an inventory parking lot, inventory parking deck, and may need to pull a specific vehicle for shipment to a customer. To find a specific vehicle located in a sea of similar-looking vehicles, the user, who may be a manufacturer's employee, may desire a higher accuracy value associated with location information corresponding to the location of the tracking device than may be available, especially if there is poor Wi-Fi signal coverage in the inventory lot. (Such higher accuracy may also be desired in a consumer context where someone seeks the location of their vehicle in a parking lot.)

However, the location of a particular tracking device attached to a vehicle in an inventory lot (manufacturers typically removably attach tracking device to a vehicle's dashboard for easy removal and reuse with another vehicle later) is not as frequently sought as that corresponding to an autistic person, turning on GNSS module 42, and its concomitant power use, does not pose as much of a detriment as it would if the GNSS module were turned on multiple times per day as would typically be the case when seeking, multiple times per day, the location of a tracking device corresponding to an autistic person. Thus, who infrequently seeks the location of a tracking device may desire more accuracy in the location information when identifying an item to be found is harder for a human to locate than when user needs to merely confirm that a person is generally where they are supposed to be but more at a more frequent rate.

In an aspect, vehicles, or other items, may be stored in a parking deck where GNSS signals may not reach all areas with sufficient strength for module 42 to adequately get a lock on satellites included in an ephemeris data file. But, as described above, a user's preferred accuracy level may require better accuracy than information associated with any Wi-Fi hot spots that a vehicle's (or other item's) tracking device may be in the proximity of. In such a scenario, Wi-Fi hot spot information may provide information as to a level of the parking deck the vehicle is located on, but a more precise parking spot may be desired. (Such higher precision may also be desired in a consumer context where someone seeks the location of their vehicle in a parking deck.) In such a scenario, the user may have specified a high level of accuracy, perhaps using slider 46, such that if the tracking device cannot obtain a quality lock on enough satellite signals specified in an ephemeris data file received from ephemeris server 48, the tracking application 6 running on the user's smart phone 8 may instruct tracking device 10 to turn on its beacon and implement method 400 described in connection with FIG. 4. Or, instead of application 6 instructing tracking device 10 to turn on its Bluetooth beacon, location server 34 may determine that, based on Wi-Fi hot spot information, the tracking device is located in a parking deck and the location server may instruct the tracking device to turn on its Bluetooth beacon instead of the tracking application doing so. Alternatively, if the tracking device was unable to determine a GNSS location after being instructed to provide GNSS location, the short-range beacon may be activated for a predetermined or requested time, such as for a predetermined beacon active time corresponding to a beacon active time value entered by a user into a UE running a tracking application via the tracking application.

If the coordinates returned from server 46 meet the desired accuracy preference associated with UE 87, server 34 forwards the location information to UE 8, which may receive the location information and use the received information to determine the location of tracking device 10 by either plotting coordinates received from server 34 on a map.

If the accuracy level associated with the location coordinates received from server 46 do not satisfy the accuracy preference associated in server 34 with UE 8, server 34 may instruct tracking device 10 to turn on GNSS module/radio 42 to obtain location coordinates if itself based on ephemeris data received from server 48. To minimize power consumption by GNSS module 42, it is preferable to use whatever location information server 46 sends based on Wi-Fi hot spot information corresponding to Wi-Fi hot spots that module 44 detects that tracking device 10 is in the presence of when a user of tracking application 6 request the location of the tracking device. However, if the accuracy value received along with the location information transmitted from server 46 does not meet the accuracy preferences associated with UE 8, server 34 instructs tracking device 10 to turn on its GNSS module 42.

If the user of UE 8 cannot locate tracking deice 10, even after the device has turned on its GNSS module 42 and forwarded GNSS latitude and longitude coordinates and perhaps elevation information to UE 8, the user of the UE may request that tracking device 10 turn on its Bluetooth beacon 16 so that tracking application 6 may implement method 400 described in connection with FIG. 4, to location the tracking device. In an aspect, instead of a user using tracking application 6 to affirmatively instruct tracking device 10 to turn on its Bluetooth beacon so that the tracking application can implement method 400, server 34 may automatically instruct the tracking device 10 to turn on its beacon 16 and tracking application 8 may automatically sense Bluetooth beacon 16 and automatically begin performing the steps of method 400. It will be appreciated that indications of proximity other than a Geiger counter gauge or audible Geiger counter clicks may be implemented at steps 435 and 445 as described in reference to FIG. 4. For example, 'lights' may increase intensity when UE 8 gets closer to tracking device ten relative to an initial default intensity according to changes in signal strength relative to an initial signal strength. Colored dots, or other shapes, may be used wherein a default color such as green is a default color corresponding to an initial signal strength of beacon 16 and the colors may changes through colors toward the red end of the rainbow spectrum as signal strength of the receive beacon 16 gets higher relative to the initial signal strength and the color may change through blues indigos and violets as the value of the received beacon's 16 signal strength gets lower relative to the initial signal strength receive when UE 8 first detected beacon 16 at step 430 described in reference to FIG. 4.

Turning now to FIG. 7, the figure illustrates a flow chart of method 700, the steps of which are shown graphically in FIG. 6 and that apply to devices, components, and items shown in FIG. 6. Method 700 starts at step 700A. At step 701, a user requests the location of a tracking device 10 using tracking application 6, and as instructed by tracking application 6, UE 8 sends a message to Internet-connected location server 34. Server 34 may be a pub/sub server that does not store location information but manages messaging between the UE, the tracking device, GNSS ephemeris server 48, and location information services provider's server 46.

At step 702, server 34 sends a message to tracking device 10 instructing the tracking device to return information corresponding to one or more Wi-Fi hot spots that Wi-Fi module may be able to obtain. Processor 40 may be a long-range wireless processor of tracking device 10 that include a processor, a modem, and long-range wireless radio circuitry.

At step 703 processor 40 instruct module 44 to obtain Wi-Fi hot spot information that may include a name of the given hot spot, such as an SSID of the given hot spot, and a unique identifier of the hot spot, such as a MAC address or identifier. Module 44 may determine a signal strength value, such as an RSSI value that represents a signal strength value relative to a signal strength when module 44 and a given hot spot are touching, or almost touching. Module may determine a signal strength value in terms of dB instead of an RSSI. Module 44 may forward to processor 40 either an absolute signal strength value in terms of dB or an RSSI value corresponding to a received signal from a given hot spot, or both, along with the name of the given hot spot and the unique identifier thereof at step 704.

At step 705 processor 40 forwards a hot spot message to server 34 wherein the hot spot message include Wi-Fi hot spot information including the name, unique identifier, and signal strength information corresponding to one or more Wi-Fi hot spots from which module 44 can detect signals and thus from which module 44 can obtain information.

Server 34 forwards the information received from tracking device 10 at step 705 to a location information services provider's server 46 at step 706. A location services provider, such as Google, Unwired Labs, or Combain, etc., typically have assembled databases that include entries of Wi-Fi hot spots, signals from which have been previously detected, and associates the detected Wi-Fi hot spots with known location information corresponding to a device that detected the Wi-Fi hot spot signals when the signals were detected. The location information and associated hot spot information was previously generated during an effort to map as many Wi-Fi hot spots with their corresponding locations; the location information providers may typically update the Wi-Fi/location coordinate information on a routine basis. The location information associated with the hot spot information may in some cases be determined based on signal strength—for example if a service provider's employee drives down a public street in a car and merely logs detected hot spots and their signal strength that emanates from a building, such as a business, but the employee does not enter the business's building to determine the exact location using a GNSS received located almost at, or exactly at, the hot-spot, the GNSS coordinates of the hot spot may only be estimated based on the signal strength and current GNSS coordinates of the employee's car at the time the hot-spot signal is received and logged. Thus, the accuracy of the hot-spot location coordinates may only be accurate to within a radius based on the signal strength of the detected hot spot signal. The location information associated with the hot spot information may in other cases be determined based on using a GNSS received located almost at, or exactly at, the hot spot device, and thus would be much more accurate (as accurate as the GNSS receiver placed at or next to, the hot spot, than when location information of a hot spot was obtained by driving by and electronically logging a given hot-spot's identification and signal strength data and associating the same with GNSS coordinates of the vehicle the driving-by employee was driving.

The location information services provider's server receives the message transmitted at step 706, looks up the one or more Wi-Fi hot spots identified in the message received at step 706, and returns to server 34 a location message at step 707 that includes location coordinates that are calculated: based on previously stored location coordinates that are associated in the provider's database with the one or more Wi-Fi hot spots identified in the 706 message and based on the corresponding signals strength value information that was contained in the 706 message. In addition to the calculated location coordinates, server also calculates, and includes in the 707 location message, a location coordinate accuracy value. The location coordinate accuracy value is calculated based on the signal strength module 44 obtained and provided in the 704 message and that was received in the 706 message, and the location accuracy stored in the data base at services provider's server 46 for the given one or more hot spots identified in the 706 message.

At step 708, server 34 determines whether the accuracy value returned in the 707 message meets a predetermined accuracy criterion, or preference, established based on the nature of the item, or person, to be tracked, or by a user preference selected by slider 46.

If the calculated error/accuracy included in the 707 message does not meet the predetermined criterion, or preference, server sends a message at step 709 to ephemeris server 48 requesting an ephemeris data file. Provider's, such as U-Blox for example, obtain ephemeris information from GNSS satellites, typically once per day or some other predetermined ephemeris update period, regarding the satellites' positions relative to the Earth, and in some cases the operating statuses of the satellites. Server 48 returns an ephemeris data file to server 34 in a message at step 710.

In some instances, server 34 may retain information pertaining to whether server 34 has already forwarded an ephemeris data file to tracking device 10 during a given day, or during a given ephemeris update period, and determine at step 708A that server 48 does not need to provide the ephemeris data file for the tracking device again during the same day, or during the same ephemeris update period. If such a determination is made at step 708A that an ephemeris data file has already been forwarded to a given tracking device on a given day, or other ephemeris update period, then steps 709 and 710 may be avoided, thus avoiding the time to obtain the same ephemeris data file that has already been obtained and avoiding the cost charged by the operator of server 48 for providing the data file if the business relationship with the operator of server 34 provides for charging for each providing of an ephemeris data file.

Regardless of whether an ephemeris data file was requested at step 709, or a determination was made by server 34 that the same file has already been forwarded to the tracking device 10 during the same day, or other ephemeris update period, server 34 forwards a message at step 711 instructing tracking device 10 to turn on its GNSS module 42. The 711 message may include an instruction to use a previously received ephemeris data file, or the 711 message may include an ephemeris data file obtained from server 48 in the 710 message.

Processor 40 receives the 711 message, and at step 712 forward in a message to GNSS module 42 an instruction to turn on the GNSS module along with either an ephemeris data file, or an instruction to use an already-received datafile, which may be stored in GNSS module, or which may be stored on a memory of tracking device 10, and which may be retrieved by module the GNSS module, or which may be retrieved by processor 40 from the memory and forwarded to the GNSS module in the 712 message.

In response to the 712 message, GNSS module is powered on, obtains location coordinates based on the ephemeris file that was provided in the 710 message or that was retrieved from a memory of tracking device 10 based on an instruction included in the 711 message.

At step 713, GNSS module 42 provides the location coordinates it obtained in response to the 712 message in a message to processor 40. Processor in turn provides the location coordinates included in the 713 message to server 34 at step 714, and server 34 forwards the location information included in the 714 message to UE 8 for use by location application 6 in determining the location of tracking device 10.

Returning to discussion of step 708, if server 34 determines that the accuracy provided from location information services provider's server 46 in the 707 satisfies the accuracy criterion or selected preference, steps 709-714 are skipped and server 34 forwards the location information to UE 8 at step 715.

Method 700 ends at step 720.

What is claimed is:

1. A mobile user equipment device ("UE") comprising:
a non-transitory computer-readable storage medium storing executable computer instructions that, when executed by a processor, perform steps comprising:
displaying, on a graphical user interface of an application, identifiers of one or more tracking devices associated with a user of the UE, wherein the graphical user interface is configured to receive a selection of an identifier of one of the one or more tracking devices by a user of the UE;
causing the UE to transmit a beacon request message to a selected one of the one or more tracking devices based on an identifier of the selected tracking device in response to receiving a selection by the user of the UE of the selected tracking device;
detecting a tracking device beacon signal of the selected tracking device;
determining an initial signal strength value of the tracking device beacon signal;
determining one or more updated signal strength values of the tracking device beacon signal at corresponding one or more predetermined update periods after determining the initial signal strength value corresponding to the tracking device beacon signal;
generating a location indication that represents the initial signal strength value, or the one or more updated signal strength values, after the one or more updated signal strength values have been determined, wherein the location indication is not based on a calculated distance from the UE to the tracking device, based on a calibration value that relates beacon signal strength to the distance to a source of the beacon;
determining that the selected tracking device has been found based on a rate of change of beacon signal strength with respect to time exceeding a predetermined found device rate change criterion; and displaying on the graphical user interface a visual indication that the selected tracking device has been found.

2. The mobile user equipment device of claim 1, further comprising an acoustic transducer, wherein the location indication comprises sound emitted by the acoustic transducer that sounds like clicks of a Geiger counter.

3. The mobile user equipment device of claim 2 wherein the rate of the clicks increases when an updated signal strength value is higher than the initial signal strength value or a previously determined updated signal strength value, and wherein the rate of the clicks decreases when an updated signal strength value is lower than the initial signal strength value or a previously determined updated signal strength value.

4. The mobile user equipment device of claim 1 wherein the computer instructions, when executed by the processor, further performs the step of displaying on the graphical user interface a visual location indicator that corresponds to the selected one of the one or more tracking devices, wherein the visual location indicator varies in response to changes of the updated signal strength values.

5. The mobile user equipment device of claim 1 wherein the mobile user equipment device does not use a calibration value that relates a given signal strength of the beacon with a distance from the mobile user equipment device to the tracking device to determine proximity of the mobile user equipment device to the tracking device.

6. The mobile user equipment device of claim 2 wherein the sound emitted by the acoustic transducer comprises a default click rate that does not correspond to a specific distance between the mobile user equipment device and the tracking device based on the initial signal strength or the updated signal strength.

7. The mobile user equipment device of claim 1 wherein the beacon signal is a Bluetooth low energy beacon signal.

8. The mobile user equipment device of claim 1 wherein the computer instructions further perform:
determining, in response to receiving a command to detect the presence of tracking devices that are within a predetermined range of a current location of the UE, tracking devices that are within the predetermined range of the current location of the UE; and
displaying on the graphical user interface of the application of identifiers of the one or more tracking devices associated with a user of the UE comprises displaying identifiers of the tracking devices that are determined to be within the predetermined range of the UE.

9. The mobile user equipment device of claim 8 wherein the UE receives a devices-present message from a tracking server of tracking devices that last reported their respective locations to the tracking server as being locations that the tracking server determines to be within the predetermined range of the current location of the UE.

10. The mobile user equipment device of claim 8 wherein the determining of the presence of tracking devices as being within the predetermined range of a current location of the UE includes detecting short-range wireless signals emitted from the tracking devices.

11. The mobile user equipment device of claim 1 wherein the found_device_rate_change_criterion is a signal strength rate rate of change criterion.

12. The mobile user equipment device of claim 1 wherein the found_device_rate_change_criterion is a click rate rate of change criterion.

13. The mobile user equipment device of claim 1:
wherein the location indication comprises an emitting from an acoustic transducer of the UE a sound that repeats at a default click rate that corresponds to the initial signal strength value after the determining of the initial signal strength value of the tracking device beacon signal; and
wherein the sound repeats at one or more different updated click rates, wherein the one or more updated click rates correspond to the one or more updated signal strength values of the tracking device beacon signal relative to the default click rate after the determining of the one or more updated signal strength values of the tracking device beacon signal.

14. The mobile user equipment device of claim 13 wherein the default click rate does not depend on the initial signal strength value.

15. The mobile user equipment device of claim 1:
wherein the location indication is a display on the graphical user interface that includes a needle at a default position relative to a displayed scale wherein the default position corresponds to the initial signal strength value after the determining of the initial signal strength value of the tracking device beacon signal; and
wherein the display includes an updated needle position relative to the displayed scale wherein the updated position corresponds to the one or more updated signal strength values of the tracking device beacon signal relative to the default rate after the determining of the one or more updated signal strength values of the tracking device beacon signal.

16. The mobile user equipment device of claim 1 wherein the beacon request message includes a beacon active time value that is based on a location scenario for an item to be located.

17. A method, comprising:
displaying, by a user equipment comprising a processor and a graphical user interface, a first identifier of a first of at least one tracking device associated with a user of the user equipment;
facilitating, by the user equipment, receiving, via the graphical user interface, a selection of an identifier of the first of the at least one tracking device to result in a selected tracking device;
facilitating, by the user equipment, transmitting a beacon request message to the selected tracking device based on an identifier of the selected tracking device in response to receiving the selection of the selected tracking device;
detecting, by the user equipment, a tracking device beacon signal of the selected tracking device;
determining, by the user equipment, an initial signal strength value of the tracking device beacon signal;
determining, by the user equipment, one or more updated signal strength values of the tracking device beacon signal at corresponding one or more predetermined update periods after determining the initial signal strength value corresponding to the tracking device beacon signal;
generating, by the user equipment, a location indication that represents the initial signal strength value, or the one or more updated signal strength values, wherein the location indication is not based on a calculated distance from the user equipment to the tracking device, based on a calibration value that relates beacon signal strength to the distance to a source of the beacon;
determining, by the user equipment, that the selected tracking device has been found based on a rate of change of beacon signal strength with respect to time exceeding a predetermined found_device_rate_change_ criterion; and displaying, by the user equipment, on the graphical user interface a visual indication that the selected tracking device has been found.

18. The method of claim 17, further comprising:

responsive to receiving a command to detect the presence of tracking devices that are within a predetermined range of a current location of the user equipment, determining, by the user equipment, a second tracking device of the at least one tacking device that is within the predetermined range of the current location of the user equipment; and displaying, by the user equipment, on the graphical user interface a second identifier corresponding to the second of the at least one tracking device.

19. A non-transitory machine-readable medium, comprising executable instructions that, when executed by a processor of a user equipment, facilitate performance of operations, comprising:

displaying, on a graphical user interface, an identifier of a tracking device associated with the user equipment;

receiving, via the graphical user interface, a selection of the tracking device to result in a selected tracking device;

responsive to receiving the selection of the tracking device, transmitting a beacon request message to the selected tracking device;

detecting a tracking device beacon signal of the selected tracking device to result in a selected tracking device beacon signal;

determining an initial signal strength value of the selected tracking device beacon signal;

determining one or more updated signal strength values of the selected tracking device beacon signal according to an update periodicity after determining the initial signal strength value corresponding to the selected tracking device beacon signal;

generating a location indication that represents the initial signal strength value, or the one or more updated signal strength values, wherein the location indication is not based on a calculated distance from the user equipment to the tracking device;

determining that the selected tracking device has been found based on a rate of change of the one or more beacon signal strength values with respect to time exceeding a predetermined found_device_rate_change_ criterion; and displaying on the graphical user interface a visual indication that the selected tracking device has been found.

* * * * *